J. Reeder,
Mower.
N°. 2,919.  Patented Jan. 20, 1843.
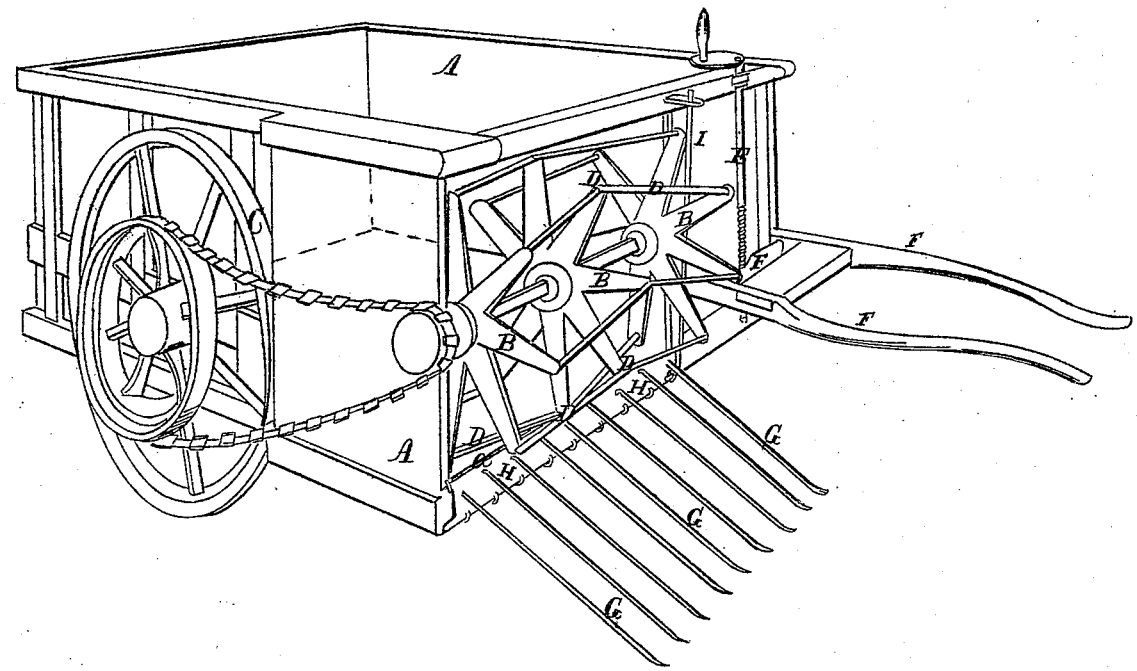

UNITED STATES PATENT OFFICE.

JESSE REEDER, OF ALTON, ILLINOIS.

IMPROVEMENT IN GRAIN-CUTTERS.

Specification forming part of Letters Patent No. 2,919, dated January 20, 1843.

*To all whom it may concern:*

Be it known that I, JESSE REEDER, of Alton, in the county of Madison and State of Illinois, have invented an Improvement in the Manner of Constructing a Machine for Cutting Small Grain, by means of which improvement it is made to raise and cut such grain as may have fallen as well as that which is standing; and I do hereby declare that the following is a full and exact description thereof.

The intention of this machine is to cut the heads of grain from the straw as it stands in the field and to leave the latter standing—a mode of harvesting which is particularly applicable in some of the Western States, where the fields of wheat and other grain are of such extent that it is frequently impossible to gather and house the produce in the ordinary mode of procedure with the sickle or the cradle. The cutting of the grain is to be effected by means of a cutting wheel or reel, which revolves and carries knives or cutters which cut the grain by their action against a stationary bar or cutter of steel, between which and the revolving knives the separation is effected. To this cutting I have added a lifting apparatus, for the purpose of raising such grain as may have fallen and of causing it to be acted on by the cutters.

In the accompanying drawing I have represented the whole apparatus in perspective in the form in which I have essayed it.

A A is a cart, which is to receive the heads of grain as they are cut off.

B B is a revolving reel, which is to receive motion from one of the wheels C of the cart, which motion may be communicated therefrom by a chain-band, as shown in the drawing, or by toothed gearing, as may be preferred.

D D are the revolving knives or cutters, which make a part of the reel, and which are so placed as to form an obtuse angle in their middles, as shown D'. These knives operate against a stationary bar or cutter, a, which extends along the fore edge of the bottom of the cart in that portion thereof in which the reel runs. The oblique position given to the revolving knives causes them to cut with ease. These knives I have formed of square bars of the requisite strength, which manner of constructing them is much preferable to the making them of flattened plates, as the heads of grain pass the more readily in between them, and are carried by them against the stationary knife.

The fore end of the cart may be elevated or depressed at pleasure to adapt it to the height of the grain to be cut. The method of doing this which I prefer is that shown in the drawings, where E is a screw, that may be turned by means of a winch under the control of the driver. This screw passes through a nut in the cross-bar F', which connects the shafts F F, the inner ends of which shafts work on joint-pins within the cart.

My improvement in raising the fallen grain is as follows:

G G are fingers, which may be made of thin rods of iron, the outer ends of which are pointed and their inner ends made fast to a plate, H H, which is hung by joint-pins b immediately below the stationary cutter a. This plate is to be moved by a lever, I, or by any analogous contrivance under the command of the driver, who is thereby enabled to elevate or depress the fingers G G at pleasure, and to adapt them to the situation of the fallen grain. These fingers always tend by their inclination to raise the fallen grain, and they have also the effect to render the cutting of the heads of the standing grain the more certain by preventing its being moved laterally should the knives be dull.

I do not claim the use of stationary horizontal fingers for conducting the heads of grain to the cutters, these having been previously used, but limit my claim to such as are hung by joint-pins, in the manner set forth.

Having thus fully described the nature of my improvement in the apparatus for harvesting small grain, what I claim therein as new, and desire to secure by Letters Patent, is—

The combining of the system of fingers G G with the revolving and the stationary cutters used for cutting the heads of the grain from the straw, the said combined apparatus being constructed and operating substantially as herein fully set forth.

JESSE REEDER.

Witnesses:
THOS. P. JONES,
EDWIN L. BRUNDAGE.